(12) United States Patent
Reinhold et al.

(10) Patent No.: US 9,707,726 B2
(45) Date of Patent: Jul. 18, 2017

(54) METHOD AND DEVICE FOR MANUFACTURING PREFORMS OF FIBER REINFORCED PLASTIC

(75) Inventors: Raphael Reinhold, Wittmund (DE); Stefan Juergens, Oldenburg (DE); Ralf Baeumer, Bremen (DE); Holger Purol, Owingen (DE); Rolf-Georg Sundermann, Buxtehude (DE); Joachim Piepenbrock, Buxtehude (DE); Alexander Gillessen, Stade (DE); Marco Goettinger, Munich (DE)

(73) Assignee: Broetje Automation GmbH, Wiefelstede (DE)

( * ) Notice: Subject to any disclaimer, the term of this patent is extended or adjusted under 35 U.S.C. 154(b) by 0 days.

(21) Appl. No.: 13/083,980

(22) Filed: Apr. 11, 2011

(65) Prior Publication Data
US 2011/0285055 A1 Nov. 24, 2011

(30) Foreign Application Priority Data

Apr. 12, 2010 (DE) .................. 10 2010 014 704

(51) Int. Cl.
*B29C 70/50* (2006.01)
*B29B 11/16* (2006.01)

(52) U.S. Cl.
CPC .............. *B29C 70/50* (2013.01); *B29B 11/16* (2013.01); *B29C 70/506* (2013.01); *Y10T 156/12* (2015.01)

(58) Field of Classification Search
CPC ..................................... B29C 70/50

USPC .......................................... 264/285
See application file for complete search history.

(56) References Cited

U.S. PATENT DOCUMENTS

| 3,705,071 | A | 12/1972 | Gras |
| 3,873,399 | A | 3/1975 | Goldsworthy et al. |
| 4,790,257 | A | 12/1988 | Schermutzki |
| 5,727,724 | A * | 3/1998 | Dowling ............... B65H 20/02 226/181 |
| 7,871,553 | B2 | 1/2011 | Wilkerson et al. |
| 8,815,036 | B2 | 8/2014 | Nitsch |
| 2006/0083806 | A1* | 4/2006 | Kasai et al. .................. 425/391 |
| 2008/0053599 | A1* | 3/2008 | Aijima .......................... 156/196 |

FOREIGN PATENT DOCUMENTS

| EP | 1 504 880 | 2/2005 |
| EP | 1918089 | 5/2008 |
| EP | 2039495 | 3/2009 |
| GB | 2113599 | 8/1983 |
| RU | 2102236 | 1/1998 |
| RU | 46223 | 6/2005 |
| RU | 2268123 | 1/2006 |
| RU | 2287431 | 9/2006 |
| SU | 390705 | 7/1973 |
| SU | 1320359 | 6/1987 |
| SU | 1590032 | 8/1990 |
| SU | 1811114 | 7/1996 |
| WO | WO 2009106341 | 9/2009 |
| WO | WO2011001080 | 1/2011 |

* cited by examiner

*Primary Examiner* — Larry Thrower
(74) *Attorney, Agent, or Firm* — Michael J. Striker

(57) ABSTRACT

In a device and method for manufacturing preforms of fiber reinforced plastic, in a first step, continuously supplied fiber layers are laterally reshaped in a predetermined manner, and the section that is obtained is curved longitudinally in a specific manner in a second step.

20 Claims, 5 Drawing Sheets

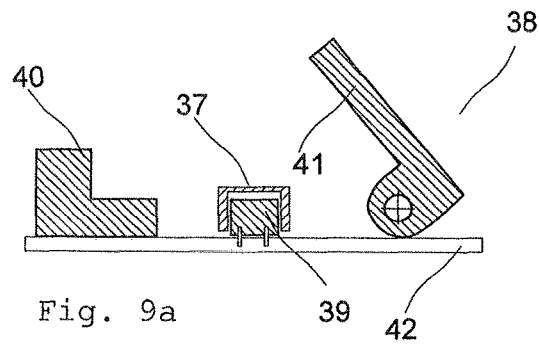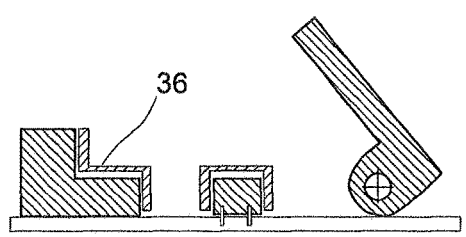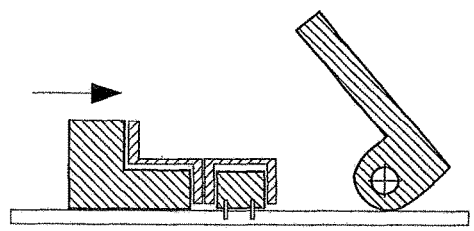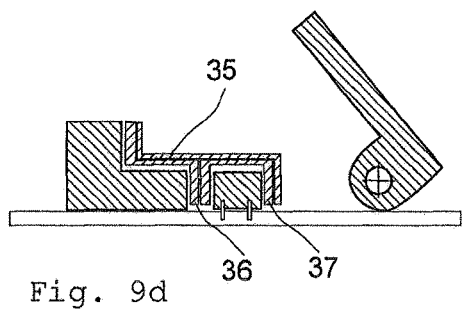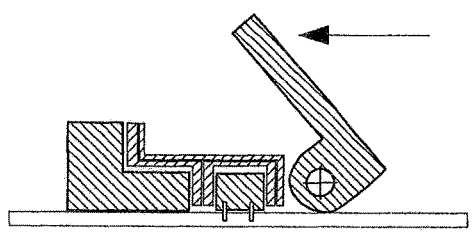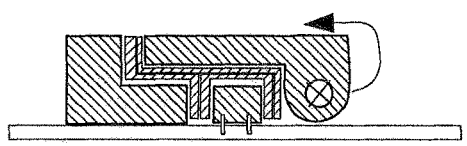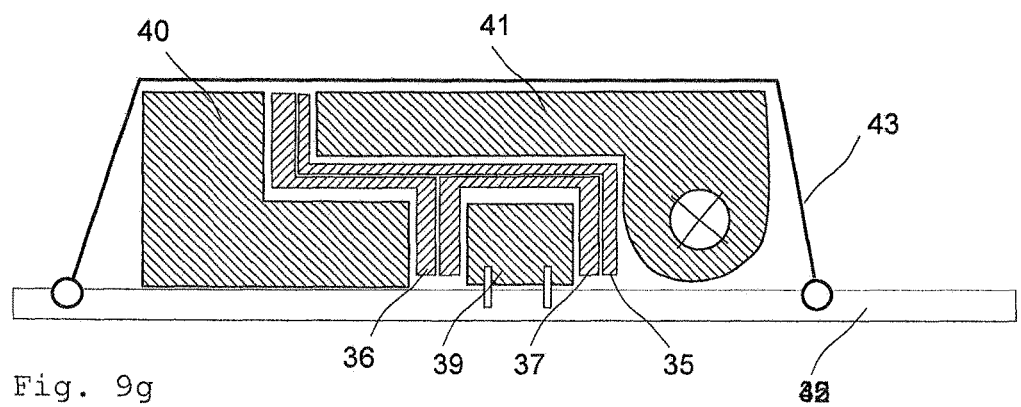

METHOD AND DEVICE FOR MANUFACTURING PREFORMS OF FIBER REINFORCED PLASTIC

CROSS-REFERENCE TO RELATED APPLICATION

The invention described and claimed hereinbelow is also described in German Patent Application DE 10 2010 014 704.4 filed on Apr. 12, 2010. This German Patent Application, whose subject matter is incorporated here by reference, provides the basis for a claim of priority of invention under 35 U.S.C. 119(a)-(d).

BACKGROUND OF THE INVENTION

The present invention relates to a device and a method for manufacturing preforms of fiber reinforced plastic.

Today, glass fiber reinforced plastics (GFRP) and carbon reinforced plastics (CRP) are chosen increasingly often for use as the material for highly diverse applications. This is due to a growing demand for lightweight construction solutions. In the field of machine engineering and, in particular, aerotechnics and space engineering, and in the construction of wind power plants, highly stable and extremely lightweight solutions based on GFRP and CRP have become indispensible.

The advantageous properties of these materials have also proven valuable in automotive and aircraft construction, of course. Predictions call for an increasing use of GFRP and CRP components for production of very large quantities in automotive construction in particular.

In aircraft construction, which deals primarily with moving large masses, the performance of a product can be increased greatly by the use of lightweight construction solutions. For example, reducing weight can also help to minimize perpetual costs such as fuel costs.

The advantage of fiber reinforced plastics is their high specific strength and stiffness combined with very low density. This is a clear advantage over metallic materials. Due to the very low density of the fibers used, and given that density of the plastics used is even lower, these lightweight construction materials are clearly superior to classically used metallic materials in terms of weight.

The entire production of components made of fiber reinforced plastics is still highly manually oriented. This results in very high production costs, thereby rendering production of large quantities, let alone mass production, unaffordable at this time. Semi-automated or fully automated processes have become known only for components having very simple geometries. For example, pultrusion is used to manufacture straight shapes having a constant cross section. This is suitable for manufacturing plastic railings, plastic ladders, tent stakes, or bed frames, for example.

The curved structural components required in the aircraft and automobile industries in particular can only be produced manually at this time, which is an elaborate and tedious process. It is precisely such curved parts composed of fiber reinforced plastics, which are often required for aerodynamic reasons or due to greater stiffness, that are becoming increasingly significant in the field of automobile or aircraft construction.

To manufacture components having greater geometric complexity, so-called "integral components", the desired structures composed of fiber semi-finished products such as rovings, wovens, non-wovens, fleeces, interwovens, or the like, are first draped into the desired shape. This takes place, for instance, by using a certain precut blank of the materials which are then draped around or in devices that are convex, concave, or have other three-dimensional shapes. Finally, the formed bodies, which are usually composed of a plurality of semi-finished products, are sewn together and impregnated with a plastic which sets to form the so-called matrix.

The disadvantages of this manufacturing method are, in particular, the small holes produced during sewing, which can negatively affect stability, for instance, since the seams can also destroy fibers.

Document EP 1 504 880 A makes known an automated process and a machine intended for use therefor, by way of which components having simpler geometric shapes, such as L, S, H, or hat shapes, can be manufactured out of prepregs in a semi-automated process. Slight curvatures can be created by tightening up the prepregs that are used in a special pressing mold during the process of manufacturing the component such that the component has a respective radius.

The disadvantage of such a method is that only very slight curvatures can be produced, and only prepregs but no other types of starting materials can be used. Prepregs are expensive and they must be covered with special sheets when stored, to prevent them from sticking together. These sheets must be removed, of course, before various layers are combined. This also complicates a continuous production of components. In addition, prepregs have a limited storage life before processing, and they must be stored in cool conditions.

Furthermore, the prepreg stack that was formed must be covered with other special sheets at the top and the bottom, to prevent them from sticking in the heated press.

To attain a desired curvature, these sheets must be prefabricated with precisely this curvature, which also requires a considerable amount of effort.

If structural components having greater complexity are required, for instance, they must be manufactured at this time as individual components having a simple geometry, which can then be combined to form the desired assembly using complex assembly processes. This production method results in very high costs, greater weight, and very long production times.

SUMMARY OF THE INVENTION

The problem addressed by the present invention is therefore that of providing a method and a device which enable preforms and components made of fiber reinforced plastics to be manufactured more cost effectively.

This problem is solved by a method for the manufacture of preforms of fiber reinforced plastic and by a device for carrying out such a method in accordance with the present invention.

Using the method according to the invention for manufacturing preforms of fiber reinforced plastic, continuously supplied fiber layers are first reshaped into a predetermined cross section by way of transverse reshaping. A profile produced in this manner is then curved in a specific manner by longitudinal reshaping in a further step.

The method according to the invention offers many advantages. One considerable advantage is that a structural component having high geometric complexity can be manufactured continuously and in an automated manner. The transverse reshaping into a target cross section is attained by way of reshaping using CNC-machined mold cores. In that particular case, the fiber layers are shaped around the mold cores using pressure rollers, and thereby gradually assume the desired section shape. A further advantage is that curved components can also be manufactured using the method according to the invention. It is also particularly advantageous that dry fiber material, which does not stick together and is easily stored, can also be used for this method.

This applies primarily to the manufacture of complex structural components. The preforms are therefore preferably composed of at least two sections.

To provide a truly continuous method which is also rapid, it is particularly preferable to manufacture at least two sections for a preform in parallel and simultaneously, and to subsequently combine them to form one component.

According to preferred embodiments, the fiber layers are stored on reels or bobbins, and are delivered to the production process from a stockpiling unit. Continuous production can be ensured as a result.

It is particularly preferable for necessary bobbin changes to take place automatically. However, it is feasible and possible to continuously prefabricate the fiber layers in a special production device or development unit situated upstream of the process.

Dry fiber material, rovings, wovens, non-wovens, fleeces, interwovens or are preferably used as fiber layers. They are subsequently enclosed in a matrix of thermoplastic material. The plastic that is used need not always be applied to the fiber layers. For example, the fiber layers can also be fabricated using fibers sheathed in plastic. In that case, individual fibers or a certain portion of the fibers or every fiber can be sheathed separately. They can be used to manufacture a woven material or the like. It is also feasible to use thermosetting plastics for the matrix. Prepregs are already prepregnated with a binder system.

To prevent any stress in the component, the fiber layers in preferred embodiments are introduced into the process relieved of strain. This strain relief can be controllable and delivers the fiber layers to the production process in an oriented and controlled manner by way of a jockey roller system or levelled rollers, for example.

Particularly preferably, the fiber layers of at least one section can be set only at certain points before the transverse reshaping. This is particularly important for sections having unidirectional fiber layers that cannot be extended in the longitudinal reshaping process. Punctiform setting therefore does not take place in the region of the eventual outer radius in particular, since the fiber layers must remain mobile relative to one another for the longitudinal reshaping.

The thermoplastic materials are preferably activated using a heating device. Infrared radiators are advantageous in that particular case.

Particularly preferably, they can be swivelled and/or rotated in particular. It is thereby possible to prevent the material from overheating if production is delayed. This can also be accomplished by covering the radiator.

Since various applications require different components having various radii, it is provided in preferred embodiments that the radius induced in the section in the longitudinal reshaping is variable. It is also feasible and reasonable to change the radius during the production of a section.

According to preferred embodiments, the sections that are produced are cut directly to the desired length. Production can be interrupted briefly for this purpose, although it is also feasible in particular to provide a displaceable cutting unit which is synchronized with the production process. As a result the sections can also be cut to the desired size without interrupting production.

The sections that are cut to the proper length in this manner are then, particularly preferably, transferred by a handling unit—which can be a robot—to an assembly and compacting unit. The robot can have a gripper arm comprising a vacuum device, for example, by way of which the finished sections are transported. The robot can grip components having a radius of between 1500 and 2500 mm, for example.

The device according to the invention for the continuous manufacture of preforms of fiber reinforced plastic has various regions. At least one stockpiling unit is provided, in which fiber layers can be stored on reels or bobbins. At least one heating unit is provided, by way of which the fiber layers can be heated, using infrared radiators, for example. At least one transverse reshaping unit and at least one longitudinal reshaping unit are also provided. The fiber layers to be processed can be supplied continuously from the stockpiling unit. The fiber layers can be reshaped in the transverse reshaping unit into a section having a predetermined cross section. This section can then be curved in the longitudinal reshaping unit into a predetermined radius.

To enable a binder system to be applied to the fiber layers if pretreated fiber layers such as prepregs are not used, a binder application module is provided according to preferred embodiments. It can be used to apply the binder system locally onto the fiber layers, although the complete fiber layers can also be provided with the binder system. The binder system can be present in powder form, for instance, and can be applied onto the fiber layers using a perforated plate and a rotating carriage. Liquid binder systems which can be applied as an aerosol using a spray head, for instance, are also feasible.

Particularly preferably the device comprises at least one of the following modules: Inductor unit, binder application module, cutting unit, handling unit, and/or assembly device.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4b a principle sketch according to FIG. 4a;

FIGS. 9a-g a schematic depiction of the mode of operation of the assembly/compacting unit, in cross sections.

DESCRIPTION OF THE PREFERRED EMBODIMENTS

Figure 1:
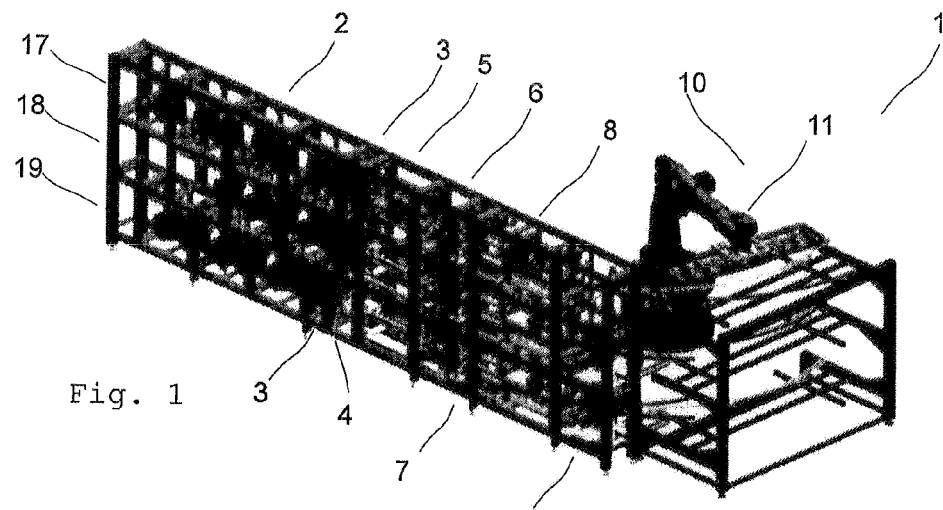
FIG. 1 a schematic depiction of the device according to the invention, in a perspective side view.

FIG. 1 shows an embodiment of a device 1 according to the invention. The system is composed of frames made of standard profiled elements. In selecting which components to use, particular attention is given to ease of replacement, temperature resistance up to at least approximately 200° C., acetone resistance, and very gentle of handling of material during the production process. Furthermore, the entire system can be lubricant-free, and therefore no limits are placed on the material selection.

The framework has a modular design, and the installations for the related functional carriers are located inside the individual frames. As a result, the system can be adapted in an optimal manner to various requirements regarding the preform that is produced, and regarding the installation site.

The system shown in FIG. 1 has a length of 8 m, a width of 2.5 m, and a height of 2 m, for example. The individual modules have a unit height of 625 mm and a unit width of 500 mm. The length of the individual modules varies depending on the unit installed, wherein the modules are provided in a grid arrangement of 125 mm in this case.

The system according to the invention is used to manufacture preforms or structural elements having complex geometries in one continuous process. This is achieved by manufacturing at least two sections in the system and then assembling them to form the complex structural element. To ensure that the process is rapid and continuous, at least two sections, which can have different cross sections, of course, can be manufactured in parallel/simultaneously in the system. This is shown as an example in FIGS. 1-3 using the three production levels 17, 18, 19 shown.

The system shown in FIG. 1 has a stockpiling unit 2 containing a total of 10 modules. In this example, each module can accommodate two bobbins 15 having fiber layers 16. Bobbins are provided for the +/−45° and the 0° layers of the sections. The method of bobbin replacement is designed such that bobbins can be replaced as quickly and in the most user-friendly manner possible. The +/−45° layers are particularly suited for draping, since a longitudinally lying strip can be reshaped into a curve without fibers being stretched or compressed in the inner or outer radius.

In each production level 17, 18, 19, a plurality of fiber layers from different bobbins can be introduced into the production process.

To ensure that material is transported without delay and in a controlled manner, it is advantageous to provide UD portions in the fiber layers. Moreover, the bobbins are advantageously designed to be braked, thereby preventing the fiber layers from being introduced too quickly. For this purpose, the bobbins have a hollow core which is clamped between two displaceable, rotatably supported conical pieces. Braking takes place by way of a spring-loaded frictional element on one of the conical pieces, for example. Other braking systems are feasible, of course, such as magnetic powder or hysteresis brakes.

Every module of the stockpiling unit has at least one rotatable removal device for safely unwinding the fiber layers from the bobbin. Rollers for levelling the material processions are provided at the end of each module of stockpiling device 2. To ensure that the material is guided in a straight manner during unwinding, insertion rings are used as shoulder rings.

Figure 2:
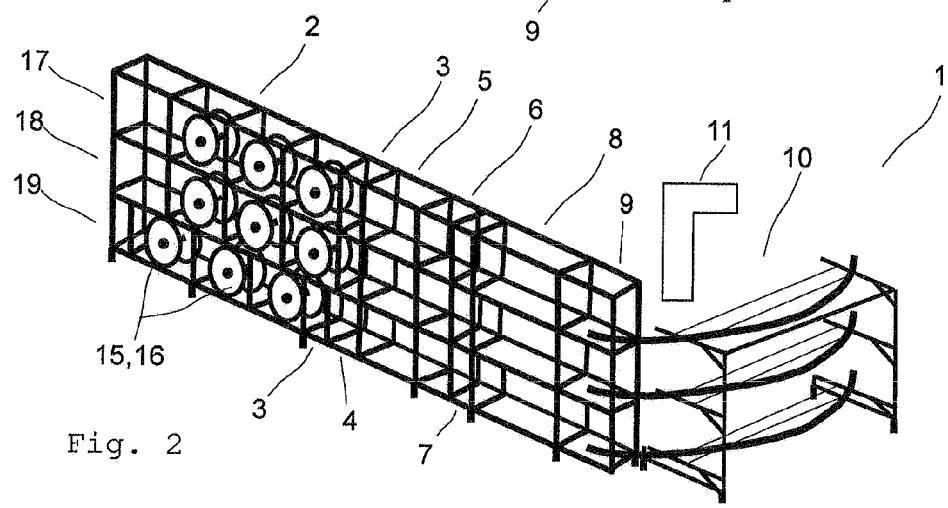
FIG. 2 a principle sketch according to FIG. 1, in a perspective side view.
Figure 3:
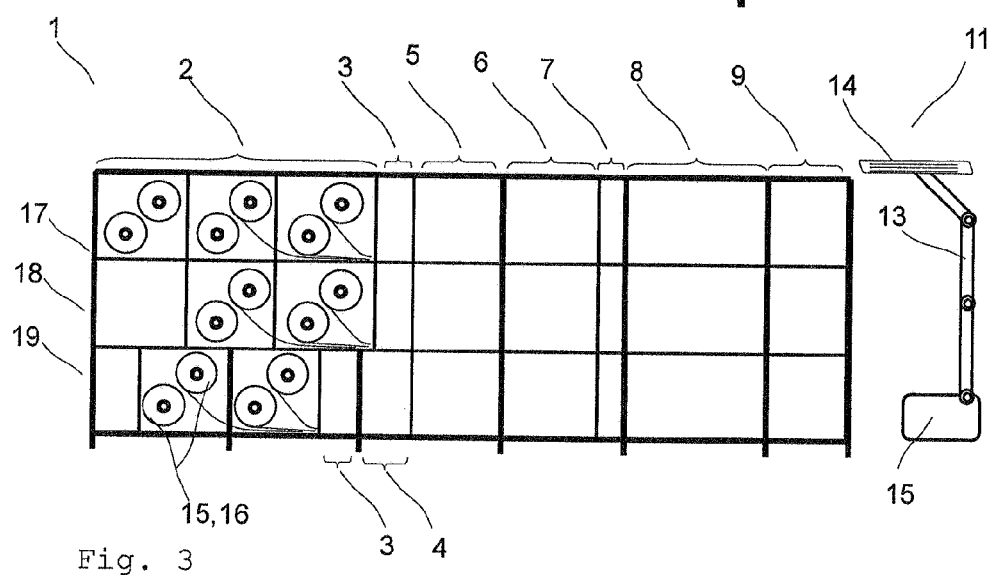
FIG. 3 a further principle sketch of the device according to the invention, in a side view.

Another possible method for the controlled unrolling of the individual fiber layers from the bobbins is a module which is not depicted in FIGS. 1-3, the strain relief unit. In that particular case, permanently levelled rollers are disposed at the entrance and the exit of the module. The function of strain relief is performed by rollers disposed therebetween in a displaceable manner on common vertical guides, which function as compensation elements depending on the tensile load. The individual fiber layers are thereby prevented from travelling at different speeds. This module can also be used in addition to the braked rollers.

The next module in FIGS. 1-3 is conveyor unit 3. It is used to bring the individual fiber layers into their correct orientation. For this purpose, set collars are provided on rotatable rollers, which guide the individual fiber layers in terms of direction and can also specify the desired material width. At the end of this module the fiber layers that are used are combined to form one stack.

In FIGS. 1-3 an additional module is installed in the lowermost level 19 of the system. Inductor unit 4 is required for a special profile property. The device according to the invention, and the method according to the invention are described with reference to a system for manufacturing a special LCF section. This LCF section (preform) 30 is described in greater detail with reference to FIGS. 7 and 8. A section for this preform has a C shape and comprises unidirectional fiber layers in the two reshaped flange sides. They cannot be extended in a subsequent longitudinal reshaping, i.e. when a curvature is applied to the component. Therefore, the fiber layers for the C-shaped section must not be set completely.

Inductor unit 4 is required for this purpose since it can be used to locally connect the fiber layers. As a result, the individual layers can still become displaced relative to one another in the region of the eventual outer radius. The required inductors are positioned using a pneumatic gripping mechanism.

The module that contains heating unit 5 is used to join the fibers layers still moving loosely on top of one another such that deviations in direction are ruled out in the subsequent transverse reshaping. In the embodiment presented here, each of the sections that are ultimately assembled to form the preform comprises unidirectional fiber layers at least on one side in the ultimate flange region. They can be heated from both sides in heating unit 5 since they are still in the flat position in heating unit 5. Various heat sources are feasible and possible. However, infrared radiators are used in the embodiment described herein, which heat only the unidirectional layers of the fiber layer stack in the process shown here. The infrared radiators can be swivelled, preferably through an angle of approximately 90°. They can also be swivelled away at any other angle, or they can be tilted away, moved laterally outwardly, or covered by metal plates, for example. Overheating of the fiber layers can therefore be prevented if the system should come to a standstill.

The heated fiber layer stacks are then pressed together using pressure rollers at desired points to form a secure composite structure. The layered structure, which is otherwise still loose, is held in the desired shape using specially shaped guides, thereby also preventing individual layers from sliding off laterally.

The following module, transverse reshaping unit 6, brings the fiber layer stack into the correct cross section. The detailed mode of operation of this module is described with reference to FIGS. 4a and 4b.

The next module is a conveyor unit 7 (see FIG. 3). It is responsible for transporting the material within the production process. In the embodiment described, a pair of knurled, stainless steel rollers in the region of the segment of the component conveys the strand through the system. In that particular case, one roller is driven by a frequency-dependent servo gearbox motor, and the other, as a counter-roller, is controlled in a spring-loaded or pneumatic manner. The counter-roller can also be displaced in the vertical axis, thereby enabling the conveyance process to be adjusted such that optimal straight-ahead running and stress-free transfer of the section to the subsequent longitudinal reshaping unit 8 are ensured. The process speed can also be controlled by regulating the motor of the first roller.

Longitudinal reshaping unit 8 is described in detail with reference to FIGS. 5*a*-*c*.

As soon as the sections have been curved in a predetermined manner in longitudinal reshaping unit 8, they are cut to the desired length in the subsequent module, cutting unit 9. In the embodiment shown here, the pneumatic feed cylinder is mechanically coupled to the cutoff wheel drive. The cutoff wheel is also pneumatically controlled.

The cutting unit can be disposed on a displacement table so it can be moved to the predetermined points for cutting the sections.

It is possible to stop the continuous process briefly to perform the cutting. However, it is feasible and particularly preferable for the cutting unit to be synchronized with the section feed, so that the production process need not be interrupted. In this case, the cutting unit moves on the displacement table in a synchronized manner with the section feed, thereby enabling the section to also be cut during forward motion.

The final module of the machine is a handling unit 10. It comprises a positioning device (e.g. a robot) 11 and a handling device (assembly/compacting unit). Robot 11 transfers the individual sections into assembly unit 38, in which the sections are assembled to form the finished preform.

For transferring, robot 11 uses a robot gripper 14 attached to an arm 13 which can have movable joints. The robot can also stand on a base 15. Robot gripper 14 has individual gripping elements which have a fixed distance in the longitudinal direction and are adjustable in the transverse direction. It is therefore possible to grip sections having a certain radius of curvature using the holding force of a vacuum. In the embodiment shown here, the radius of curvature can be between 1500 mm and 2500 mm.

Figure 4A:
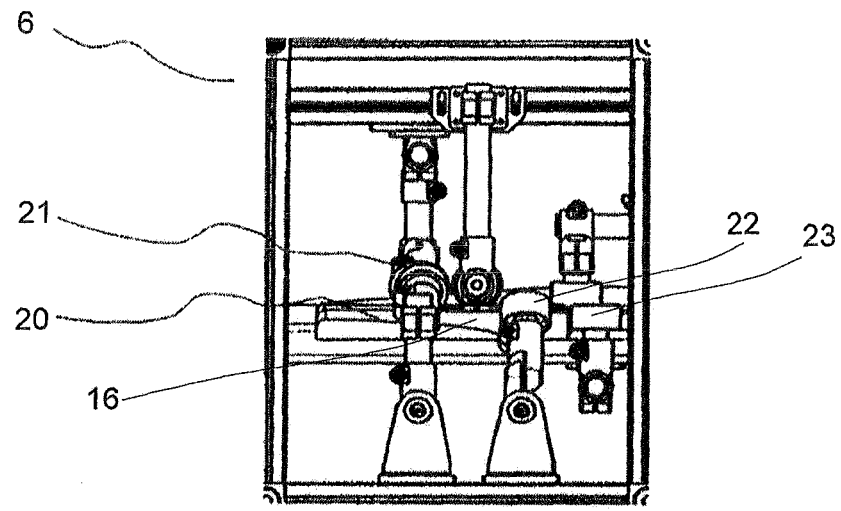
FIG. 4a a schematic depiction of the transverse shaping unit.
Figure 4B:
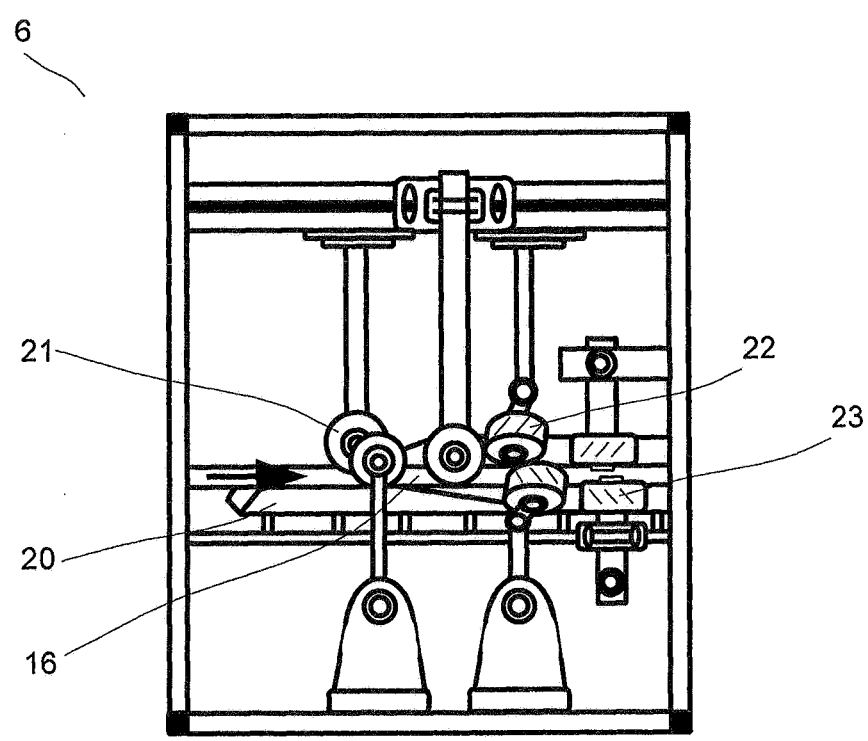

FIGS. 4*a* and 4*b* show an embodiment of reshaping device 6.

The schematic depiction presented in FIG. 4*a* shows various driven and non-driven pressure rollers. Some rollers 21 press vertically onto fiber layers 16. Other rollers 22 press fiber layers 16 around a CNC-machined mold core 20. Rollers 23 are also provided at a 90° angle relative to the original fiber layers. Rollers 21, 22, 23 can have a shape that is convex, concave, or straight. It is also possible in particular for all rollers to be adjustable into certain contact angles. All shaping elements and all conveying elements used in the system are made of stainless steel material.

FIG. 4*b* shows a similar reshaping device 6 in a schematic depiction.

Figure 5A:
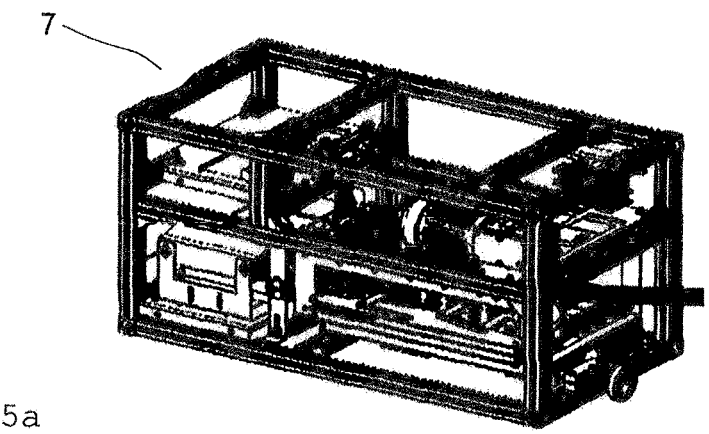
FIG. 5a a schematic depiction of the longitudinal reshaping unit, in a side view.
Figure 5B:
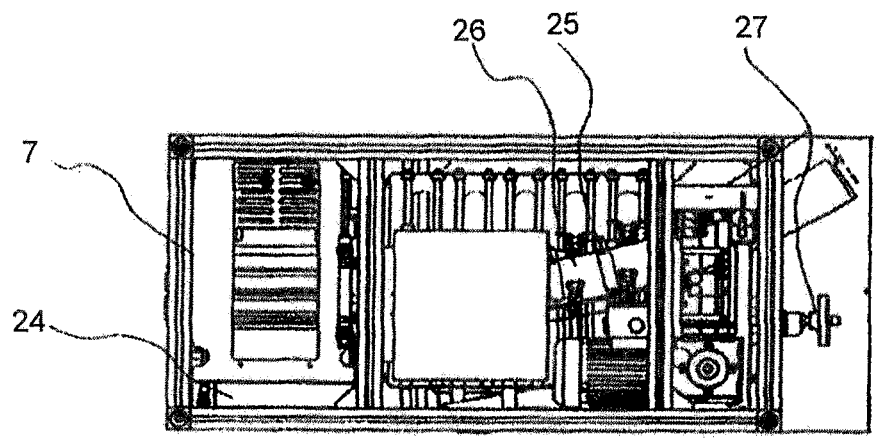
FIG. 5b a schematic depiction of the longitudinal reshaping unit, in a top view.
Figure 5C:
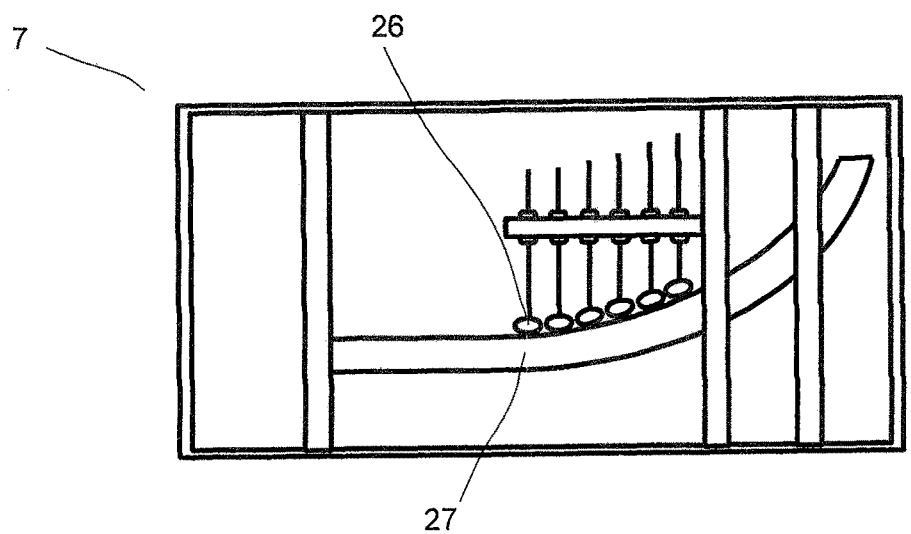
FIG. 5c a principle sketch of the longitudinal reshaping unit according to FIG. 5b.

FIGS. 5*a*-*c* show embodiments according to the invention of longitudinal reshaping unit 7. FIG. 5*a* shows a module having a longitudinal reshaping device 7, in a perspective view from the side.

Longitudinal reshaping unit 7 is shown from above in FIG. 5*b*. Radiant heaters 24 can also be assigned to longitudinal reshaping unit 7. They can also be designed to be displaceable, swivellable, or tiltable, to prevent overheating. In this case as well, shielding can be used to keep heat away from the material. Cooling also takes place in this module. It may be accelerated by introducing cold air.

In the embodiment described here, a toothed belt unit conveys the section through longitudinal reshaping unit 7. The section moves over reshaping and guiding plates 25 which, in this embodiment, can be brought into a certain radius by way of a plunger 26 which can be displaced by a spindle 27. Spindle 27 can be used to change a specified radius during production as well, and therefore a different radius can be formed along a section.

Flexible conveyor belts, which in this embodiment can adapt to the radii of curvature of the section in the range of 1500 mm to 2500 mm, grip a flange of the section on both sides. Other radii are also feasible and possible, of course. The parallel guidance also results in a large working region for set up when the system is being started up.

Figure 6:
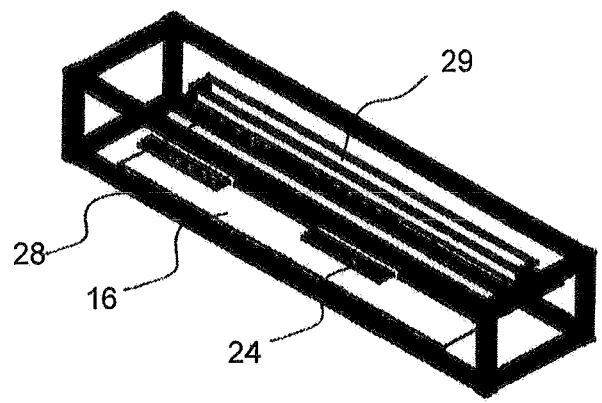
FIG. 6 a schematic depiction of a binder application module in a perspective side view.

FIG. 6 shows a binder application module 28 according to the invention, in a perspective side view. In this module, fiber layers 16 can be provided with a binder system completely or only locally. For this purpose, a rotating carriage 29, to the underside of which a perforated plate is attached, is used to apply a powdery binder to fiber layers 16 passing through.

A shaft comprising guide vanes installed on the longitudinal side is supported in rotating carriage 29 and enables the vanes to rotate when the shaft is rotated, and delivers a consistent quantity of the binder onto the perforated plate. The rotational speed of rotating carriage 29 is matched to the feed rate of fiber layers 16, thereby ensuring that a defined quantity of the powdered binder drops through the perforated plate onto fiber layers 16.

To bond the binder to the fiber layers, radiant heaters, in particular infrared radiators 24 in this case, are assigned to binder application module 28.

Figure 7:
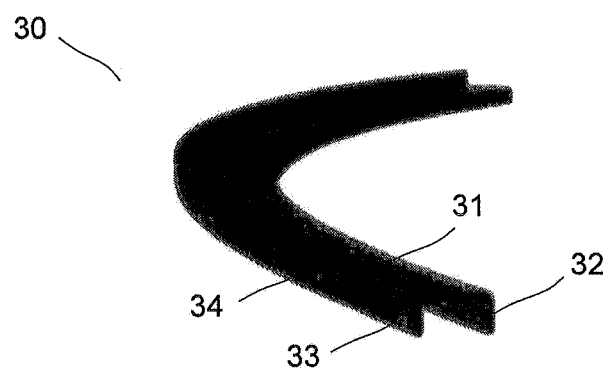
FIG. 7 an LCF section manufactured using the method according to the invention
Figure 8:
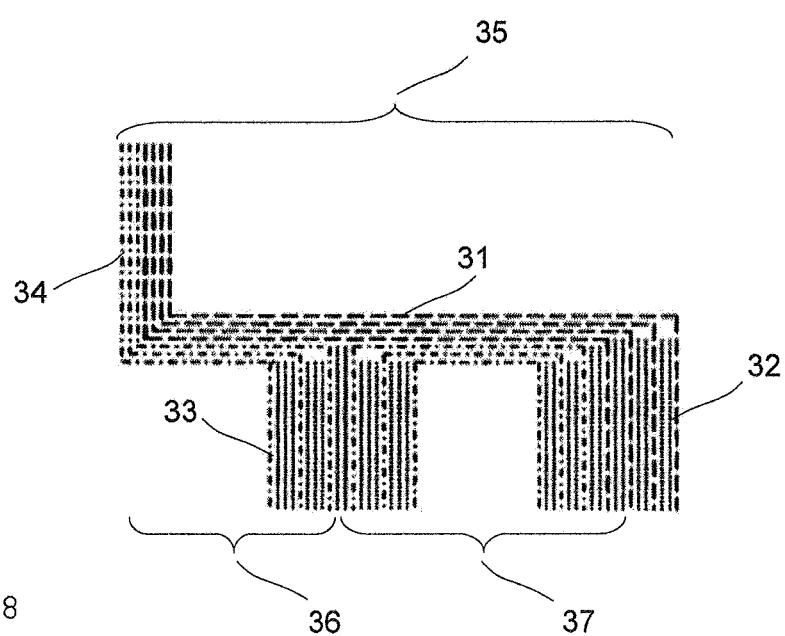
FIG. 8 a schematically depicted cross section of an LCF section of the type shown in FIG. 7.

FIGS. 7 and 8 show a preform 30 that can be manufactured using an embodiment according to the invention. FIG. 7 shows a schematic depiction with lateral surfaces 32, 33, 34, and horizontal surface 31.

The special layered structure of this structural section is shown in a section in FIG. 8. In that particular case, three manufactured sections 35, 36, 37 are assembled in an assembly device 38 (see FIG. 9). Two sections, 35 and 36, have an S shape, and one section 37 has a C shape. Large S section 35 lies over small S section 36 and C section 37, and forms horizontal surface 21. Lateral surface 34 is composed of large and small S sections 35, 36, respectively, lateral surface 33 is composed of small S section 36 and C section 37, and lateral surface 32 is composed of large S section 35 and C section 37.

By connecting the three individual sections 35, 36, 37, a highly complex and dimensionally stable structural component is obtained.

FIGS. 9*a* to 9*g* show the assembly of a preform 30 (LCF section), according to the invention, out of three sections 35, 36, 37.

An assembly unit 38 having a base plate 42 and three rigid metal molds 39, 40, 41 is provided for this purpose. Metal mold 39 is securely connected to base plate 42. The three sections are now inserted by robot 11 one after the other into assembly unit 38. First, C section 37 is placed onto metal mold 39 (FIG. 9*a*). Next, small S section 36 is placed onto metal mold 40. Metal mold 40 can be displaced on the base plate and is slid directly against the C section on metal block 40 (FIG. 9*b, c*).

Next, large S section 35 is placed onto the two sections (FIG. 9d). Metal mold 41, which is designed as a displaceable lever, is now moved next to sections 35, 36, 37 and folded down to secure sections 35, 36, 37 (FIGS. 9e, f).

All metal blocks 39, 40, 41 are equipped with heating cartridges and activate the binder in the fiber layers, thereby joining the sections to form a preform. A vacuum diaphragm 43 provides the required process pressure (FIG. 9g).

The compacting carried out in assembly unit 38 minimizes the set-up time of the actual RTM curing device.

It will be understood that each of the elements described above, or two or more together, may also find a useful application in other types of constructions and methods differing from the types described above.

While the invention has been illustrated and described as embodied in a method and device for manufacturing preforms of fiber reinfoced plastic, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method for manufacturing preforms of fiber reinforced plastic having complex geometries in one continuous process, comprising:
   in a first step, reshaping continuously supplied fiber layers by transversely reshaping into a predetermined cross section using a transverse reshaping unit comprising driven and non-driven pressure rollers that shape the fiber layers around a mold core in the continuous process, wherein at least part of the pressure rollers are arranged at inclined angles to the fiber layers, as originally supplied;
   in a second step, performing longitudinal reshaping on the fiber layers transversely reshaped into the predetermined cross section to realize a curved section defined by a radius using a longitudinal reshaping unit in the continuous process, wherein the radius of the curved section defined by the longitudinal reshaping is variable; and
   in a third step executed after the first and second steps, cutting the reshaped sections to certain sizes using a cutting unit.

2. A method for manufacturing preforms as defined in claim 1, further comprising manufacturing preforms each composed of at least two sections.

3. A method for manufacturing preforms as defined in claim 2, wherein said manufacturing includes manufacturing the at least two sections in parallel.

4. A method for manufacturing preforms as defined in claim 1, further comprising storing the fiber layers on elements selected from the group consisting of reels and bobbins; and delivering the fiber layers to a production process from a stockpiling device.

5. A method for manufacturing preforms as defined in claim 1, further comprising replacing a bobbin on which the fiber layers are stored automatically.

6. A method for manufacturing performs as defined in claim 1, further comprising prefabricating the fiber layers continuously in an upstream production device.

7. A method for manufacturing preforms as defined in claim 1, further comprising replacing a bobbin on which the fiber layers are stored automatically, and prefabricating the fiber layers continuously in an upstream production device.

8. A method for manufacturing preforms as defined in claim 1, further comprising using an element selected from the group consisting of dry fiber material, ravings, wovens, non-wovens, fleeces, interwovens and prepregs as the fiber layers, and also using thermoplastic material as a matrix, which can also sheath the fibers.

9. A method for manufacturing preforms as defined in claim 1, further comprising introducing the fiber layers into a process relieved of strain.

10. A method for manufacturing preforms as defined in claim 2, further comprising setting the fiber layers of at least one of the sections before the transverse reshaping only at certain points.

11. A method for manufacturing preforms as defined in claim 2, further comprising setting the fiber layers of at least one of the sections before the transverse reshaping only at certain points not in a region of an ultimate outer radius.

12. A method for manufacturing preforms as defined in claim 8, further comprising activating the thermoplastic material by a heating device.

13. A method for manufacturing preforms as defined in claim 12, wherein said activating includes activating the thermoplastic material by the heating device which is at least one infrared radiator.

14. A method for manufacturing preforms as defined in claim 1, further comprising using heat sources which move in a manner selected from the group consisting of swiveling, rotating, shielding, and combinations thereof.

15. A method for manufacturing preforms as defined in claim 1, wherein the third step is part of the continuous process.

16. A method for manufacturing preforms as defined in claim 1, further comprising transferring the sections which are manufactured, by a handling unit to an assembly/compacting unit.

17. A method for manufacturing preforms of fiber reinforced plastic having complex geometries, comprising:
   in a first step, transversely reshaping continuously supplied fiber layers into a predetermined cross section using a transverse reshaping unit comprising driven and non-driven pressure rollers that shape the fiber layers around a mold core, wherein at least part of the pressure rollers are arranged at inclined angles relative to the fiber layers, as originally supplied;
   in a second step, longitudinally reshaping at least part of the fiber layers transversely reshaped into the predetermined cross section to realize a curved section defined by a radius of curvature using a longitudinal reshaping unit, wherein the radius of curvature of the curved section defined by the longitudinal reshaping is variable and wherein the first and second steps are carried out sequentially as a continuous process; and
   in a third step, executed after the first and second steps, cutting the reshaped sections to certain sizes using a cutting unit.

18. The method of manufacturing as set forth in claim 17, wherein the first, second and the third steps are executed as a continuous process.

19. The method of manufacturing as set forth in claim 17, wherein the fiber layers transversely reshaped in the first step are supplied continuously to the longitudinal reshaping unit for longitudinal reshaping in the second step as part of a continuous process.

20. The method of manufacturing as set forth in claim 19, wherein the transversely reshaped fiber layers longitudinally reshaped in the second step are supplied continuously to the cutting unit in the third step as part of the continuous process.

* * * * *